(12) United States Patent
Hatakeyama et al.

(10) Patent No.: US 6,567,224 B2
(45) Date of Patent: May 20, 2003

(54) OPTICAL ELEMENT HAVING INTEGRATED OPTICAL LENS AND LENS HOLDER, AND PRODUCTION METHOD THEREFOR

(75) Inventors: Shigeru Hatakeyama, Miyagi-ken (JP); Kimihiro Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 27 days.

(21) Appl. No.: 09/881,894

(22) Filed: Jun. 14, 2001

(65) Prior Publication Data

US 2001/0053032 A1 Dec. 20, 2001

(30) Foreign Application Priority Data

Jun. 19, 2000 (JP) ......................... 2000-187512

(51) Int. Cl.[7] .............. G02B 7/02; C03B 11/12
(52) U.S. Cl. ........................ 359/819; 65/319
(58) Field of Search .................. 359/811, 819, 359/820; 65/64, 319

(56) References Cited

U.S. PATENT DOCUMENTS

| 4,891,053 A | * | 1/1990 | Bartman et al. ............... 65/64 |
| 5,188,652 A | * | 2/1993 | Nakamura et al. ............ 65/319 |
| 5,805,361 A | * | 9/1998 | Morimoto et al. ......... 359/819 |
| 5,851,255 A | | 12/1998 | Ohtsuki et al. |

* cited by examiner

Primary Examiner—Georgia Epps
Assistant Examiner—Gary O'Neill
(74) Attorney, Agent, or Firm—Beyer Weaver & Thomas, LLP

(57) ABSTRACT

An optical element includes a lens holder, and an optical lens integrally held by an inner wall portion of the lens holder and having a lens optical surface at an opening in the lens holder in the direction of the optical axis of the optical lens. A projecting portion is formed in the inner wall portion of the lens holder and adjacent to the opening. An outer peripheral edge surface of the lens optical surface is placed under the projecting portion and is pressed in contact with the projecting portion over the entire periphery.

8 Claims, 5 Drawing Sheets

OPTICAL ELEMENT HAVING INTEGRATED OPTICAL LENS AND LENS HOLDER, AND PRODUCTION METHOD THEREFOR

BACKGROUND OF THE INVENTION

1. Field of the Invention

The present invention relates to an optical element having an integrated optical lens and lens holder, and to a production method for the optical element. More particularly, the present invention relates to a structure for holding an optical lens and a lens holder when press-molding the optical lens.

2. Description of the Related Art

In various fields of optical communication devices, optical information reading devices, and the like, optical elements in which an optical lens is held by a lens holder are used. In a well-known technique for producing such a conventional optical element, an optical lens is combined with the inner surface of a lens holder by press fitting when being press-molded from an optical glass material.

In the conventional optical element, a cylindrical or spherical lens material made of optical glass is placed in a lens holder made of metal, such as stainless steel, and generally shaped like a hollow cylinder; is heated and softened by a heating member; is pressed and deformed by being clamped by dies from above and below; and is press-fitted in the lens holder, whereby the lens material and the lens holder are combined. Moreover, lens optical surfaces are formed with an optical axis in the direction of the cylindrical axis of the lens holder by transferring the die surfaces onto the lens material.

As shown in FIGS. 3 and 4 however, in the above-described conventional optical element, gaps L1 and L2 of approximately 20 μm are formed between the inner diameter of an inner wall 13a of a lens holder 13 into which a lens material 14 is press-fitted and the outer diameters of dies 11 and 12 for press-molding the lens material 14. Therefore, when the lens material 14 is press-molded, portions 14a and 14b of the deformed lens material 14 protrude in an annular ring outward through the gaps L1 and L2, and the shapes of outer peripheral edge surfaces 15c and 15d of lens optical surfaces 15a and 15b connected to the inner wall 13a of the lens holder 13 form a discontinuity and become disjointed and non-uniform.

For this reason, the protruding portions 14a and 14b of the lens material 14 formed at the outer peripheral edge surfaces 15c and 15d of the lens optical surfaces 15a an 15b may be broken and chipped due to vibration or external force, and glass powder formed thereby may adhere to the lens optical surfaces 15a and 15b.

SUMMARY OF THE INVENTION

The present invention solves the above problems. An object of the present invention is to provide an optical element having an integrated optical lens and lens holder that prevents chipping and adhesion of glass powder resulting from protrusion of a part of an outer peripheral edge surface of a lens optical surface connected to the inner wall of the lens holder when a lens material is press-molded. It is another object of the present invention to provide a production method for the optical element.

In order to overcome the above problems, according to an aspect of the present invention, there is provided an optical element including a lens holder made of metal and shaped like a hollow cylinder, and an optical lens integrally held by an inner wall portion of the lens holder and having a lens optical surface at an opening in the direction of the optical axis, wherein an annular projecting portion is formed in the inner wall portion of the lens holder and adjacent to the opening, and an outer peripheral edge surface of the lens optical surface is placed under the projecting portion and is pressed in contact with the projecting portion over the entire periphery.

In this case, the shape of the outer peripheral edge surface of the lens optical surface connected to the inner wall portion of the lens holder is made continuous and uniform. This can prevent the lens optical surface from being broken and chipped due to vibration or external force and can prevent glass powder from adhering to the lens optical surface.

Preferably, a part of the projecting portion is buried in the outer peripheral edge surface of the lens optical surface. This allows the lens holder to reliably hold the optical lens.

According to another aspect of the present invention, there is provided an optical element production method including the steps of forming an annular projecting portion adjacent to an opening of an inner wall portion of a lens holder shaped like a hollow cylinder, inserting a lens material made of optical glass in the cylinder of the lens holder, press-fitting the lens material in the cylinder by heating, and pressing and deforming by a die, thereby forming a lens optical surface at the opening in the direction of the optical axis, and deforming the projecting portion by the die so that a part of the projecting portion is buried in an outer peripheral edge surface of the lens optical surface.

In this case, no gap is formed between the inner diameter of the inner wall portion of the lens holder and the outer diameter of the die when the lens material is press-molded, the deformed lens material does not partly protrude outward, and the shape of the outer peripheral edge surface of the lens optical surface connected to the inner wall portion of the lens holder can be made continuous and uniform.

According to a further aspect of the present invention, there is provided an optical element production method including the steps of inserting a lens material made of optical glass in a cylindrical portion of a lens holder shaped like a hollow cylinder, press-fitting the lens material in the cylindrical portion by heating, and pressing and deforming by a die, thereby forming a lens optical surface at an opening in the direction of the optical axis, extending a die surface for pressing a pressed surface of the lens material outside the inner wall of the cylindrical portion of the lens holder when pressing and deforming the lens material, and performing molding while an outer peripheral edge surface of the lens optical surface and an outer flat surface of the cylindrical portion of the lens holder are covered with the die surface.

In this case, no gap is formed between the inner wall of the lens holder and the die when the lens material is press-molded, the deformed lens material does not partly protrude outward, and the shape of the outer peripheral edge surface of the lens optical surface connected to the inner wall of the lens holder can be made continuous and uniform.

Further objects, features, and advantages of the present invention will become apparent from the following description of the preferred embodiments with reference to the attached drawings.

DESCRIPTION OF THE PREFERRED EMBODIMENTS

Figure 1:
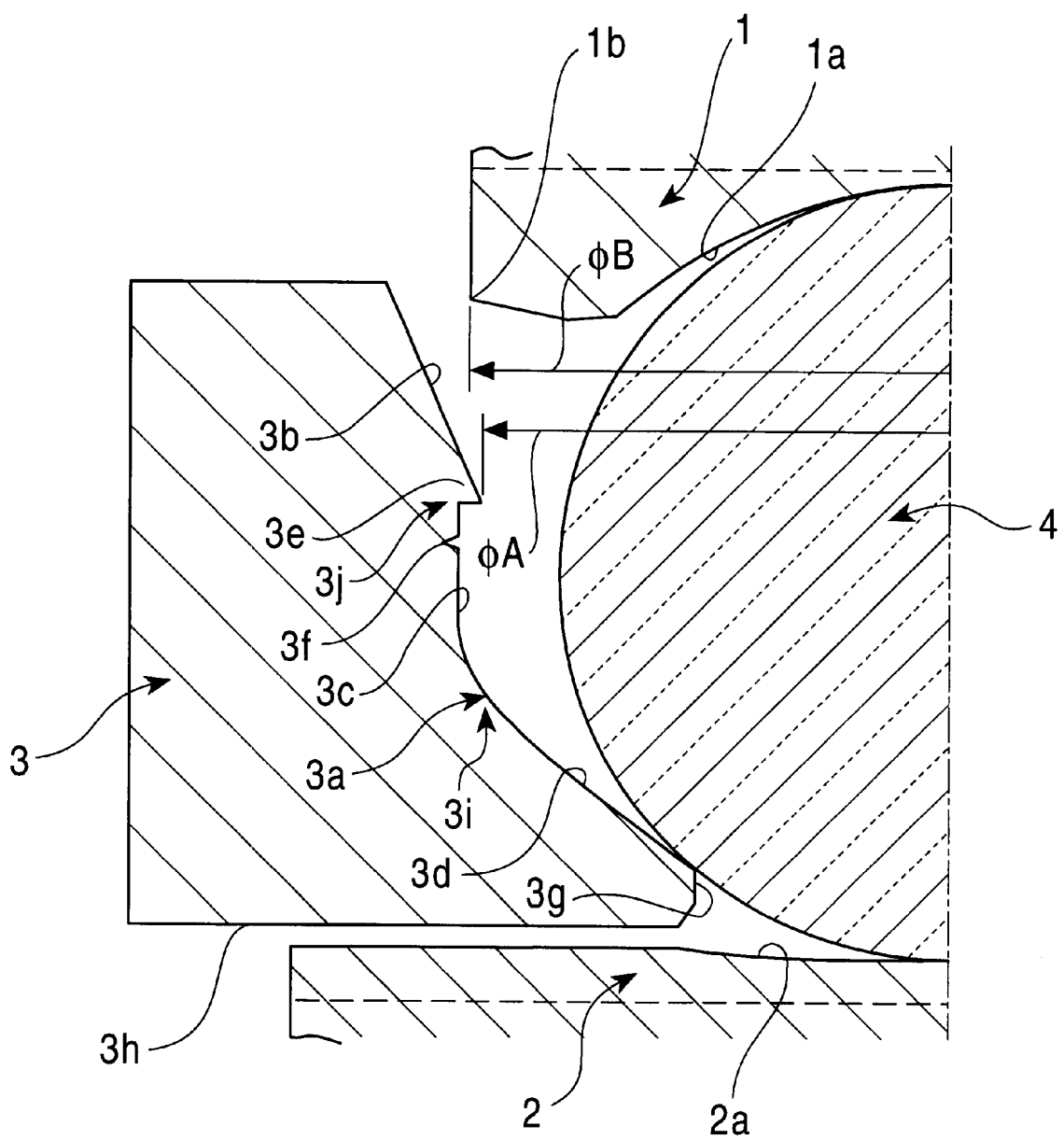
FIG. 1 is a sectional view of an optical element before molding according to an embodiment of the present invention from which the right half thereof is omitted.
Figure 2:
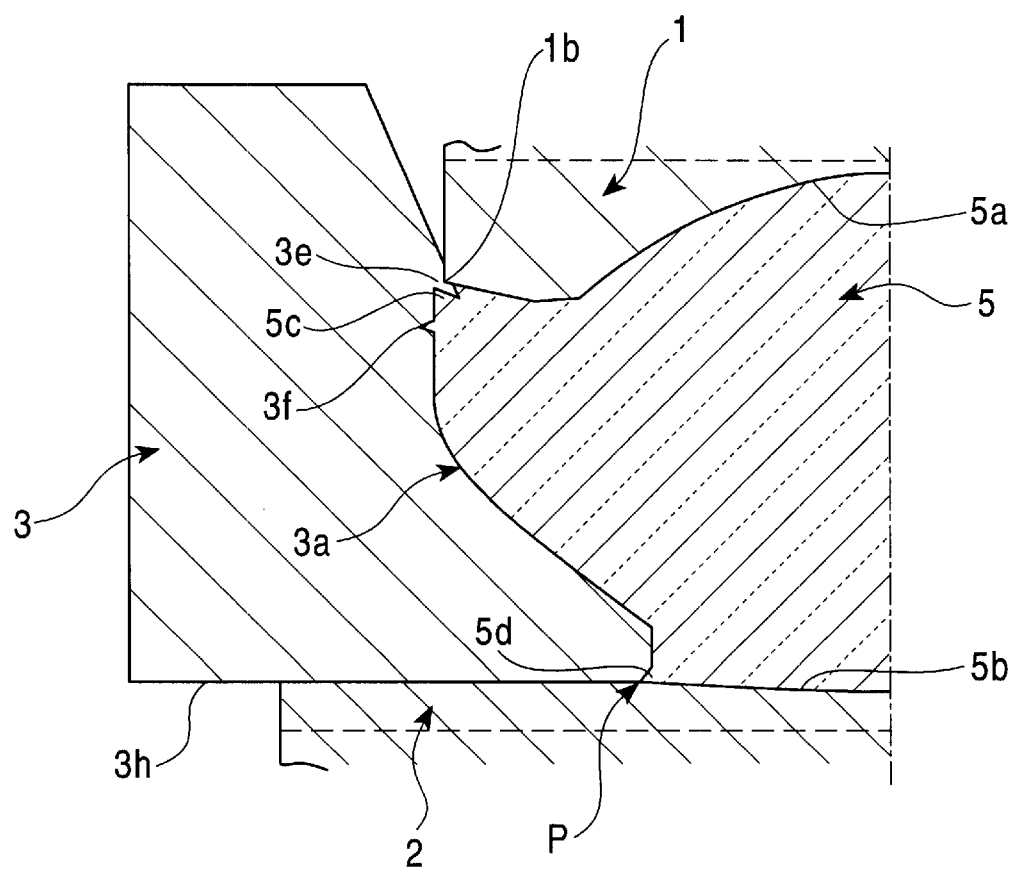
FIG. 2 is a sectional view of the optical element after molding from which the right half thereof is omitted.
Figure 3:
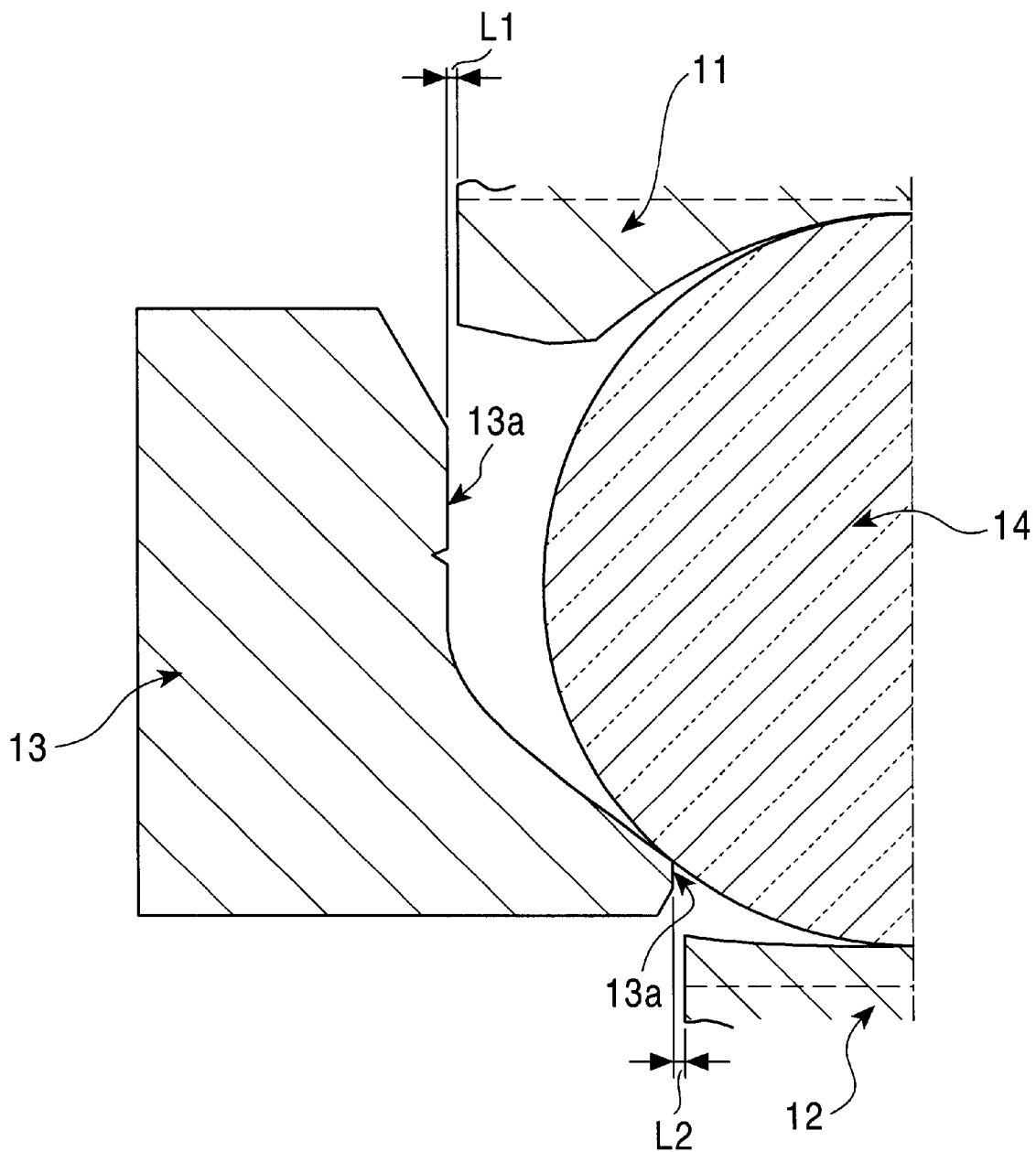
FIG. 3 is a sectional view of a conventional optical element before molding from which the right half thereof is omitted.
Figure 4:
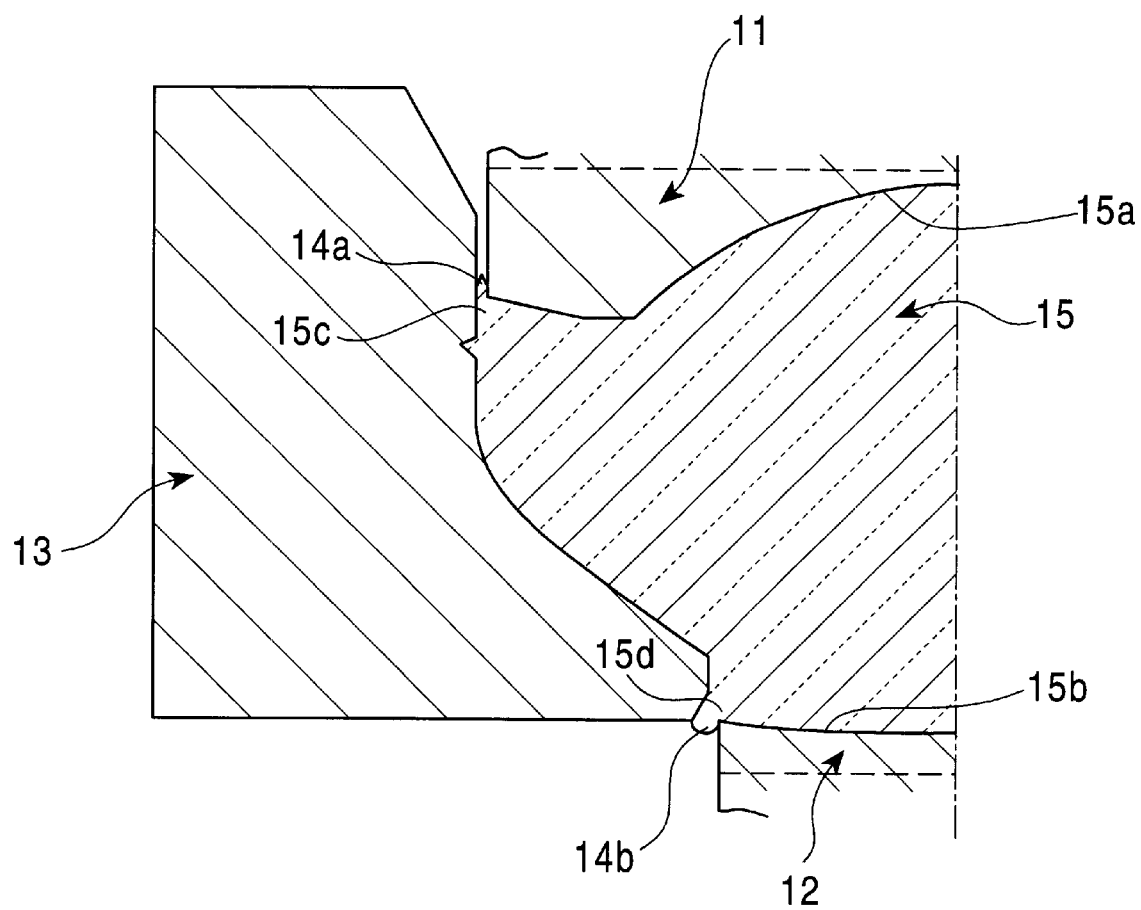
FIG. 4 is a sectional view of the conventional optical element after molding from which the right half thereof is omitted.
Figure 5:
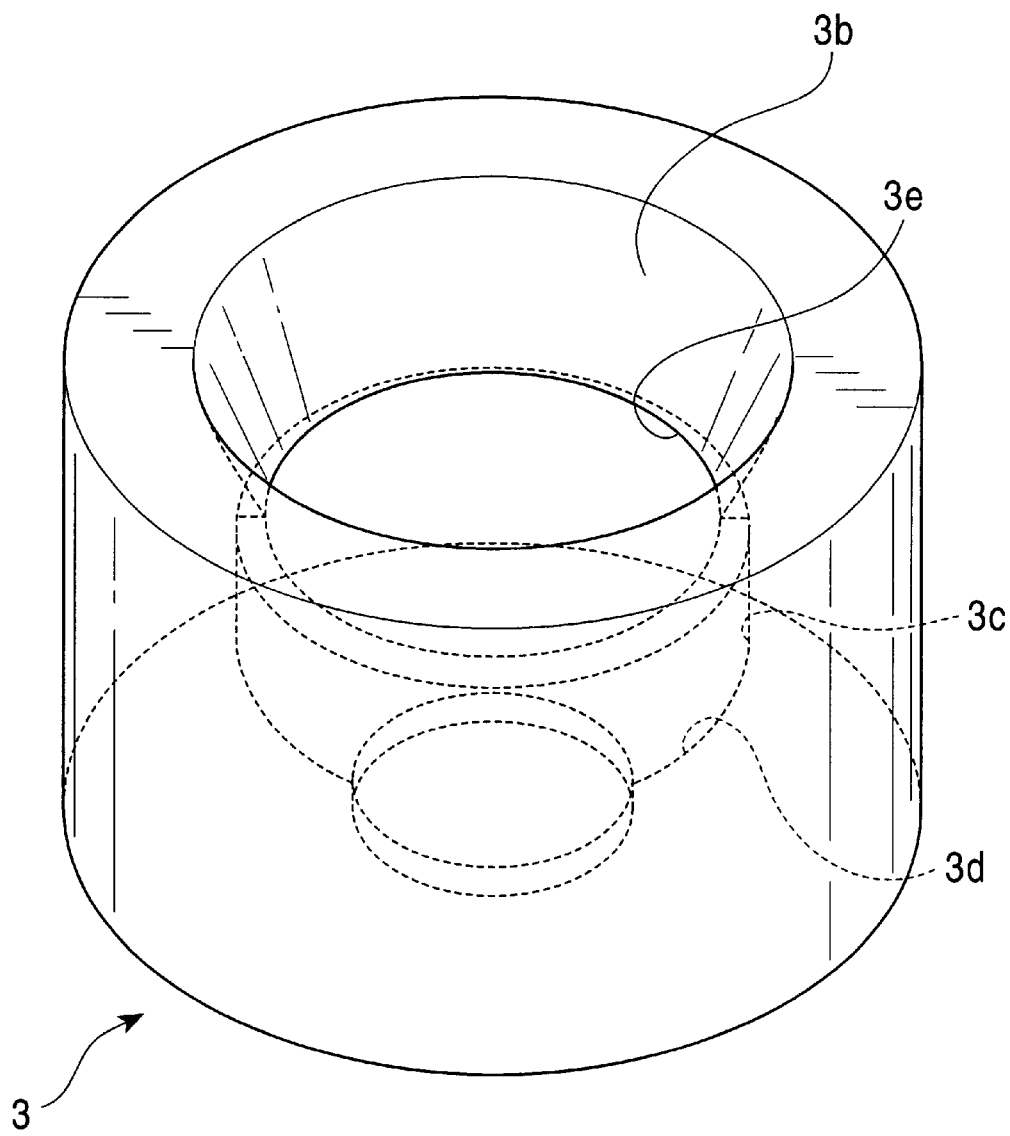
FIG. 5 is a perspective view of the lens holder component of the optical element illustrated in FIG. 1.

An embodiment of the present invention will be described below with reference to FIGS. 1 and 2. FIG. 1 is a sectional view of an optical element of this embodiment before molding from which the right half thereof is omitted, and FIG. 2 is a sectional view of the optical element after molding from which the right half thereof is omitted.

Referring to FIG. 1, an upper die 1 is disposed so as to slide in the upward and downward direction in the figure. A spherical or aspherical optical transfer surface 1a which is recessed upward is formed on the center of the lower surface of the upper die 1. A lower die 2 is also disposed so as to slide in the upward and downward direction in FIG. 1. A spherical or aspherical optical transfer surface 2a, which is recessed downward or which is flat, is formed on the center of the upper surface of the lower die 2.

A lens holder 3 is made of a ferrite stainless steel or the like and is shaped like a hollow cylinder. An inner wall portion 3a in the cylindrical lens holder 3 includes a first inclined face 3b formed in the upper part so as to be greatly widened conically outward, a first cylindrical face 3c connected to the first inclined face 3b in the intermediate part so as to have a constant diameter and a predetermined length, and a second inclined face 3d connected to the first cylindrical face 3c in the lower part so as to be narrowed conicallyinward.

At a connecting portion 3j between the first inclined face 3b and the first cylindrical face 3c, an annular projecting portion 3e having an inner diameter φA is formed to project from the first cylindrical face 3c inward toward the cylindrical axis. The inner diameter φA of the projecting portion 3e and the outer diameter φB (outer end portion 1b) of the upper die 1 have a relationship φB>φA. Furthermore, an annular groove 3f of V-shaped cross section is formed on the first cylindrical face 3c. A connecting portion 3i between the first cylindrical face 3c and the second inclined face 3d is arc-shaped in cross-section forming a hemispheric frustum fillet connecting faces 3c and 3d. A second cylindrical face 3g having a constant diameter and a predetermined length is formed on the lower side of the second inclined face 3d so that it is slightly widened at the leading end.

A lens material 4 is made of an optical glass material, for example, a lead oxide glass material. In this embodiment, the lens material 4 is spherically shaped.

A method for producing the optical element will now be described with reference to FIGS. 1 and 2.

The lens holder 3 is positioned and fitted in a recess of a die body (not shown). In this case, the lens material 4 is positioned and placed on the lower end of the second inclined face 3d in the inner wall portion 3a of the lens holder 3.

Although not shown in FIGS. 1 and 2, a heating member, such as a high-frequency heating device, (not shown) is placed on the outer periphery of the lens holder 3 so as to be opposed thereto. The heating member heats the lens holder 3 and also heats the lens material 4 over its softening point. The lens material 4 may be supplied in the lens holder 3 after being preheated.

When the upper and lower dies 1 and 2 placed on the upper and lower sides of the lens material 4 are driven in such a direction as to clamp the lens material 4, the spherical lens material 4 is press-molded by the optical transfer surfaces 1a and 2a. As a result, an optical lens 5 having spherical or aspherical lens optical surfaces 5a and 5b is obtained, as shown in FIG. 2.

In this case, since the lens material 4 is spherical, the lens optical surfaces 5a and 5b can be effectively molded even when the amount of shift or change of the lens material 4 pressed by the optical transfer surfaces 1a and 2a of the upper and lower dies 1 and 2 is small.

Since the inner wall portion 3a of the lens holder 3 is generally arc-shaped in cross-section in a manner similar to that of the spherical surface of the lens material 4, as shown in the connecting portion 3i between the first cylindrical face 3c and the second inclined portion 3d in FIG. 2, the shape of the lens material 4 can easily conform to the shape of the inner wall portion 3a, that is, the glass material easily fills the cylinder of the lens holder 3. For this reason, when the optical lens 5 is press-molded from the lens material 4, the pressing force against the lens holder 3 can be increased.

Pressed lens material 4 enters the annular groove 3f formed on the first cylindrical face 3c of the inner wall portion 3a of the lens holder 3. This allows the optical lens 5 to be reliably held by the lens holder 3.

The annular projecting portion 3e is formed at the connecting portion 3j between the first inclined face 3b and the first cylindrical face 3c so as to project radially inward from the first cylindrical face 3c toward the cylindrical axis. That is, as shown in FIG. 2, when the lens optical surface 5a disposed on the upper side is molded by pressing the lens material 4 by the upper die 1 in the above-described molding process, an outer peripheral edge surface 5c of the pressed and deformed lens optical surface 5a is placed on the under side of and is pressed in contact with the projecting portion 3e over the entire periphery.

When pressing and deforming the lens material 4, the projecting portion 3e is pressed and deformed by the outer end portion 1b of the upper die 1a so that a part of the projecting portion 3d is buried in the outer peripheral edge surface 5c of the lens optical surface 5a. For this reason, even when the center of the upper die 1 and the center of the lens holder 3 are misaligned and the amount of deformation of the projecting portion 3e is nonuniform, the optical lens 5 can be reliably held by the lens holder 3 with no gap therebetween.

Since there is no gap between the inner diameter of the inner wall portion 3a of the lens holder 3 and the outer diameter of the upper die 1 when the lens material 4 is subjected to press molding, the deformed lens material 4 does not partly protrude outward, and the outer peripheral edge surface 5c of the lens optical surface 5a is filled in the region between the projecting portion 3e and the inner wall portion 3a of the lens holder 3 with no gap therebetween. This prevents the lens optical surface 5a from being broken and chipped due to vibration and external force, and also prevents glass powder from adhering to the lens optical surface 5a.

Since a part of the projecting portion 3e is buried in the outer peripheral edge surface 5c of the lens optical surface 5a, the optical lens 5 can be reliably held by the lens holder 3.

In the molding process shown in FIG. 2, when the lens optical surface 5b disposed on the lower side of lens 5 is molded by pressing the lens material 4 by the lower die 2, the surface of the lower die 2 for pressing the pressed surface of the lens material 4 extends outside the inner wall portion 3a of the lens holder 3 over the entire periphery thereof. By abutting the extended portion against an outer flat face 3h of the lens holder 3, the outer peripheral edge surface 5d of the lens optical surface 5b and the outer flat face 3h of the lens holder 3 are covered by the same die surface so that they are aligned at a point P.

Since the outer flat face 3h of the lens holder 3h is covered by the extended portion of the surface of the lower die 2 when press-molding the lens material 4, no gap is formed between the inner diameter of the inner wall portion 3a of the lens holder 3 and the outer diameter of the lower die 2, and between the outer flat face 3h of the lens holder 3 and the lower die 2. Therefore, the deformed lens material 4 does not partly protrude outward, and the shape of the outer peripheral edge surface 5d of the lens optical surface 5b connected to the inner wall portion 3a of the lens holder 3 is made continuous and uniform. This also prevents the lens optical surface 5a from being broken and chipped due to vibration and external force, and prevents glass powder from adhering to the lens optical surface 5a.

While the lens material 4 is spherical in the above embodiment, it need not be strictly spherical, but may have a slightly deformed shape, for example, may be elliptical in cross section and may have a boss or the like. Alternatively, the lens material 4 may be cylindrical. In this case, advantages similar to those in the above can be obtained.

While the lens material 4 is held by the second inclined face 3d of the inner wall portion 3a of the lens holder 3 in the above embodiment, instead of forming such a support portion for the lens material 4 in the lens holder 3, the inner wall portion 3a of the lens holder 3 may be shaped like a substantially straight cylinder and the lens material 4 may be supported by the dies.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical element comprising:
   a lens holder;
   an optical lens integrally held by an inner wall portion of said lens holder and having a lens optical surface at an opening in said lens holder in the direction of the optical axis of said optical lens;
   a projecting portion formed in said inner wall portion of said lens holder and adjacent to said opening, and an outer peripheral edge surface of said lens optical surface placed under said projecting portion and pressed in contact with said projecting portion over the entire periphery.

2. An optical element according to claim 1, wherein a part of said projecting portion is buried in said outer peripheral edge surface of said lens optical surface.

3. An optical element production method comprising the steps of:
   forming an projecting portion adjacent to an opening of an inner wall portion of a lens holder;
   inserting a lens material in said lens holder;
   press-fitting said lens material into said lens holder by heating, pressing and deforming by a die, thereby forming a lens optical surface of an optical lens at said opening in the direction of the optical axis of said optical lens; and
   deforming said projecting portion by said die so that a part of said projecting portion is buried in an outer peripheral edge surface of said lens optical surface.

4. An optical element production method comprising the steps of:
   inserting a lens material in a lens holder having an inner wall portion;
   press-fitting said lens material into said lens holder by heating, and pressing and deforming by a die, thereby forming a lens optical surface of an optical lens at an opening in the lens holder in the direction of the optical axis of said optical lens;
   extending a die surface for pressing a pressed surface of said lens material outside said inner wall portion of said lens holder at said step of press-fitting said lens material; and
   performing molding while an outer peripheral edge surface of said lens optical surface and an outer flat surface of said lens holder are covered with said die surface.

5. An optical element according to claim 1 further including a groove formed on said inner wall portion of said lens holder, wherein a part of said optical lens fills said groove thereby reliably holding said optical lens in said lens holder.

6. An optical element according to claim 1, wherein said lens holder is made of metal and shaped like a hollow cylinder.

7. An optical element production method according to claim 3 further including the steps of:
   forming a groove in said inner wall portion of said lens holder;
   filling said groove with said lens material at said step of press-fitting.

8. An optical element production method according to claim 3, wherein said projecting portion is annularly shaped, and;
   wherein said lens material is optical glass.

* * * * *